(No Model.)
J. E. PATTISON.
DEVICE FOR REMOVING SEDIMENT.
No. 307,324. Patented Oct. 28, 1884.
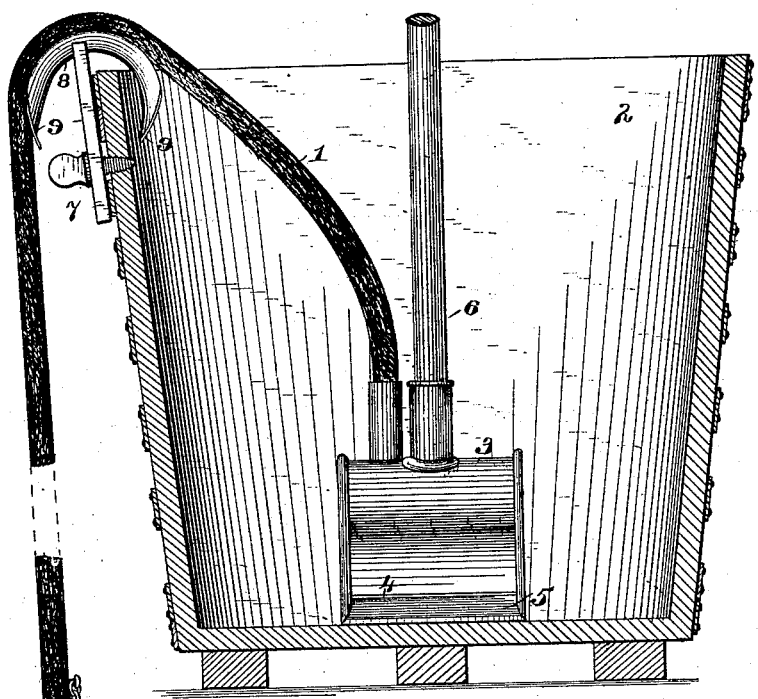
Fig. 1.
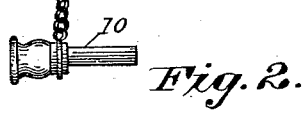
Fig. 4.
Fig. 2.  Fig. 3.
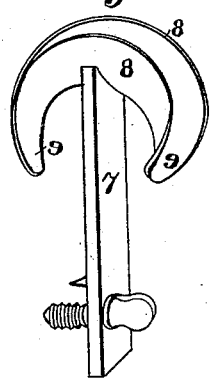
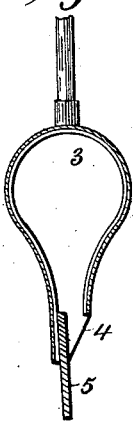
Witnesses
Wm. J. Tanner
Geo. Wheelock
Inventor
John E. Pattison,
Knight Bros.
Atty's

UNITED STATES PATENT OFFICE.

JOHN E. PATTISON, OF NEW ORLEANS, LOUISIANA.

DEVICE FOR REMOVING SEDIMENT.

SPECIFICATION forming part of Letters Patent No. 307,324, dated October 28, 1884.

Application filed November 7, 1883. (No model.)

*To all whom it may concern:*

Be it known that I, JOHN E. PATTISON, a citizen of the United States, residing at New Orleans, in the parish of Orleans and State of Louisiana, have invented certain new and useful Improvements in Devices for Removing Sediment from the Bottoms of Cisterns, Tanks, and other Receptacles, and in siphons for this and similar purposes, of which the following is a specification.

My improvement relates more especially to devices for removing sediment from those cisterns or tanks standing above the level of the ground for containing rain-water, sugar-juice, or other liquid. It is well known that in the course of time such tanks become covered at the bottom with thick sediment settling from the liquid in the tank; and my improvement consists in a siphon adapted to be readily applied to such tank or cistern for the purpose of utilizing the superincumbent mass of liquid in the tank for forcing off the sediment in the bottom thereof. To this end I provide the end of a flexible tube with a hollow metallic head having an opening for the ingress of the sediment and a brush or scraper for loosening the same from the bottom of the tank. To the head is attached, permanently or otherwise, a staff of sufficient length to reach the top of the tank or cistern for operating the implement. To remedy these evils I employ, in connection with a flexible tube, a rest or standard having a curved guide or saddle on the tube adapted to be fixed to the edge of the tank or cistern, and so hold the tube as to prevent it from buckling, and at the same time to be freely turned in every direction to reach every portion of the tank.

In order that my invention may be more fully understood, I will proceed to describe it with reference to the accompanying drawings, in which—

Figure 1 is a sectional view of a tank with my improvement employed. Fig. 2 is a detached view of the siphon-rest; Fig. 3, a similar view of a modification thereof. Fig. 4 is a vertical section showing the construction of the hollow head.

1 represents a flexible tube of sufficient length to reach from the edge to any part of the bottom of a cistern, 2, and to a somewhat lower point without such cistern. This tube terminates in a metallic head or chamber, 3, having an opening, 4, for the ingress of liquid and sediment, and a brush or scraper, 5, for loosening such sediment from the bottom of the tank or cistern. A staff, 6, fixed or attached in any manner to the said head enables its manipulation.

Fixed to the edge of the cistern by a wood-screw, as shown in Fig. 2, or, if the tank be metallic, by a clamp-screw, as shown in Fig. 3, is the rest or saddle of the siphon, consisting of post 7, having at top a curved seat or channel, 8, with flaring ends 9, to permit the turning of the tube in any direction, so that it will not interfere with the free manipulation of the instrument. The outer end of the tube 1 is furnished with a stopper, 10.

When it is desired to use the instrument, the rest should be screwed onto the edge of the tank, the hose or tube, and also the hollow head, if necessary, filled with liquid, and the stopper then inserted, the middle of the hose being then laid over the rest and the head lowered into the liquid by means of the staff 6, and the stopper removed. Liquid going through the opening 4 will pass up through the head of the siphon and be discharged. Such head being held at the bottom of the tank or cistern, and so moved as to loosen and take up the sediment, the bottom of the cistern will be effectually cleaned.

Having thus described my invention, the following is what I claim as new therein and desire to secure by Letters Patent:

1. In a device for removing sediment from the bottoms of tanks, a flexible siphon provided with a hollow head having a suitable aperture for the ingress of the sediment, and a staff for operating the same, substantially as set forth.

2. In combination with a flexible siphon, the curved rest or saddle fixed to the edge of the tank or cistern and adapted to prevent the said siphon from buckling, while permitting its free manipulation, as set forth.

3. In combination with a flexible siphon having means for support from the edge of the cistern, a head having an opening for the ingress of liquid, and a stopper for the outer end of such siphon, for the purpose set forth.

JOHN E. PATTISON.

Witnesses:
J. G. EUSTIS,
H. M. HYAMS.